May 23, 1933.  E. M. MORRIS  1,910,708

METHOD AND APPARATUS FOR FUSING LENS BLANKS

Filed May 11, 1929

EDWARD M. MORRIS.
INVENTOR

BY *G. A. Kellstad*

ATTORNEY

Patented May 23, 1933

1,910,703

UNITED STATES PATENT OFFICE

EDWARD M. MORRIS, OF ROCHESTER, NEW YORK, ASSIGNOR TO BAUSCH & LOMB OPTICAL COMPANY, OF ROCHESTER, NEW YORK, A CORPORATION OF NEW YORK

METHOD AND APPARATUS FOR FUSING LENS BLANKS

Application filed May 11, 1929. Serial No. 362,315.

The present invention relates to the manufacture of fused multifocal lens blanks which are formed by fusing a minor lens member or disk onto a major lens member, the refractive indices of the two members being different. More particularly this invention has reference to an apparatus or device for holding or securing the two lens members in proper position during the fusing operation.

One of the objects of the present invention is to provide an improved means for holding the minor lens member on the major lens member during the fusing operation. To this and other ends the invention resides in the improvements hereinafter described, the novel features being pointed out in the appended claims.

Referring to the drawing.

Figure 1:
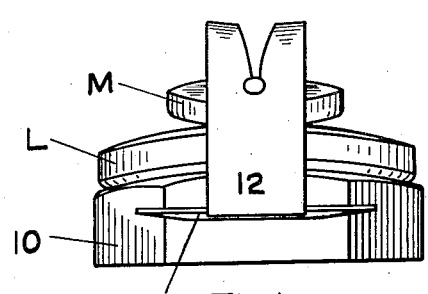
Fig. 1 is a side view showing my device in operation.
Figure 2:
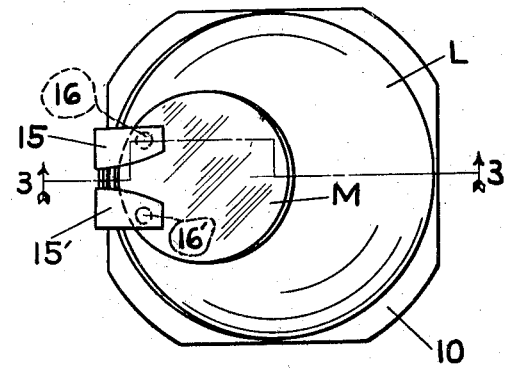
Fig. 2 is a top plan view.
Figure 4:
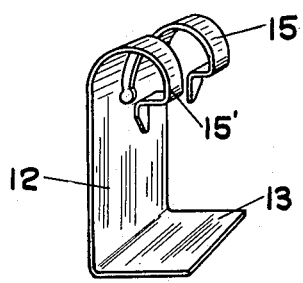
Fig. 4 is a perspective view of my clamping device.
Figure 3:
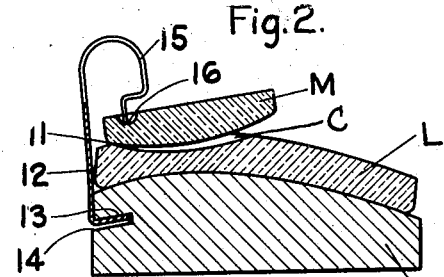
Fig. 3 is a sectional view taken on 3—3.
Figure 5:
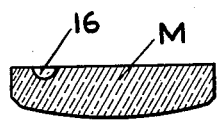
Fig. 5 is a sectional view of the disk which is fused to the major blank.

In the manufacture of fused multifocal lens blanks a countersink or seat is ground and polished on one surface of the major lens member which is usually made of crown glass. The minor lens member or disk, which has its under side suitably ground and polished, is generally made of flint glass which has a lower softening point than the crown glass. The disk is placed on the countersink in such a manner that it contacts with the countersink at one point and the lens members are then subjected to heat in a suitable furnace. Under the influence of heat, the flint glass disk gradually softens and drops into the seat or countersink on the major lens member. The fusion starts at the contact point and continues to progress gradually as the flint glass disk softens and drops into its seat, thereby forcing out all air and preventing the formation of air bubbles within the glass. In carrying out this fusing operation it is necessary that the major and minor lens members be held in contact at one point and it is also essential that the minor lens member be firmly held in position with respect to the countersink so that subsequent handling will not disturb its proper allocation.

The application of my invention is illustrated in the drawing wherein 10 indicates the usual fusing block which is composed of any suitable refractory material and serves as a support for the major lens member L. A suitable countersink or seat C is formed on a surface of the major lens member L to receive the minor lens member M which is held in contact adjacent the outer edge at 11.

The minor lens member M is held in position by means of my improved clip 12 which is preferably made of some suitable material such as spring brass, for example. The clip 12 has a horizontal portion 13 which slips into a slot 14 provided in block 10 while the other end of the clip 12 is bifurcated to provide the two resilient fingers or arms 15 and 15'. Holding means such as depressions 16 and 16' are formed in the top of minor lens member M so that the ends of arms 15 and 15' may respectively project therein and thereby firmly hold the minor lens member in position.

Figure 6:
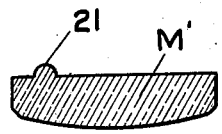
Fig. 6 is a sectional view of a modified form of disk.
Figure 7:
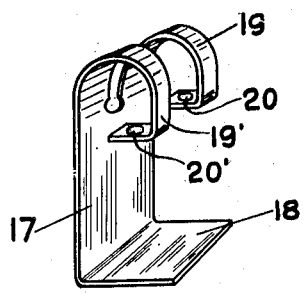
Fig. 7 is a perspective view of a modified form of clamping device.

A modified form of my clip, indicated at 17 in Fig. 7, has a horizontal portion 18 and the two arms 19 and 19'. The end portions of arms 19 and 19' are provided with openings 20 and 20' which are adapted to respectively fit over the holding means such as projections 21 on a modified form of minor lens member M' shown in Fig. 6.

From the foregoing it will be apparent that the disk or minor lens member is held in proper contact with the countersink of the major lens member to effect the fusing operation. The minor lens member is also firmly held in position over the countersink and cannot be accidentally disturbed by subsequent handling of the block in the fusing operation. The fusing clips 12 and 17 can be easily and cheaply made by punching them from suitable sheet material, as brass, for example. The depressions 16 in lens member M can be molded or otherwise formed in the surface of the lens member. Projections 21 could also be molded or formed integral with the lens member M'. I am thus able to attain the objects of my invention and provide an efficient means for holding the minor lens member in position during the fusing of multifocal blanks. Various modifications can obviously be made by those skilled in the art without departing from the spirit of my invention as pointed out in the appended claims.

I claim:

1. A method of producing multifocal lens blanks which comprises forming a countersink on a major lens member, forming a plurality of depressions on the surface of a minor lens member, holding said minor lens member in said countersink by means which cooperate with said depressions and fusing said minor lens member in said countersink.

2. The step in the method of producing fused multifocal lenses which comprises forming holding means on a minor lens member at a point spaced from the top surface of the member.

3. A device for fusing multifocal lens blanks composed of a major lens member and a minor lens member having a plurality of depressions formed near its upper surface, said device comprising a block for supportting the major member, said block having a recess, and a clip having an end positioned in said recess, the other end of said clip having a plurality of spaced fingers which cooperate, respectively, with said depressions.

EDWARD M. MORRIS.